US009727943B1

(12) United States Patent
Sams

(10) Patent No.: US 9,727,943 B1
(45) Date of Patent: Aug. 8, 2017

(54) REMOTE RENDERING CONTROL OBJECTS

(71) Applicant: Google Inc., Mountain View, CA (US)

(72) Inventor: Jason Sams, Los Gatos, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 15/048,587

(22) Filed: Feb. 19, 2016

Related U.S. Application Data

(63) Continuation of application No. 13/436,447, filed on Mar. 30, 2012, now Pat. No. 9,292,902.

(60) Provisional application No. 61/469,346, filed on Mar. 30, 2011.

(51) Int. Cl.
*G06T 1/00* (2006.01)
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC .................................. G06T 1/20; G06T 1/60
USPC .......................................................... 345/522
See application file for complete search history.

(56) References Cited

U.S. PATENT DOCUMENTS

| | | | | | |
|---|---|---|---|---|---|
| 8,561,038 | B1* | 10/2013 | Sams | ........................ | G06F 8/30 |
| | | | | | 717/107 |
| 2005/0050547 | A1* | 3/2005 | Whittle | ............. | G06F 17/30899 |
| | | | | | 719/310 |
| 2006/0004910 | A1* | 1/2006 | Burd | ................. | G06F 17/30893 |
| | | | | | 709/203 |
| 2009/0210863 | A1* | 8/2009 | Vasilik | ...................... | G06F 8/70 |
| | | | | | 717/130 |
| 2010/0020098 | A1 | 1/2010 | Elmieh et al. | | |
| 2010/0093319 | A1* | 4/2010 | Sherman | ........... | H04M 3/42178 |
| | | | | | 455/414.1 |
| 2010/0306642 | A1* | 12/2010 | Lowet | ............... | G06F 17/30873 |
| | | | | | 715/234 |
| 2011/0115818 | A1 | 5/2011 | Chung et al. | | |
| 2011/0283328 | A1 | 11/2011 | Davis et al. | | |
| 2012/0062577 | A1 | 3/2012 | Nixon et al. | | |

(Continued)

OTHER PUBLICATIONS

GLX, "Initial ism for "OpenGL Extension to the X Window System,"" Wikipedia, Remote RenderScript\Art\GLX—Wikipedia, the free encyclopedia—Accessed Jan. 4, 2011.htm, 2 pp.

(Continued)

*Primary Examiner* — Ke Xiao
*Assistant Examiner* — Kim-Thanh T Tran
(74) *Attorney, Agent, or Firm* — Morris & Kamlay LLP

(57) ABSTRACT

This disclosure is directed to the control of graphical output of a second computing device by a first computing device. According to these techniques, a first computing device may be configured to generate at least one control object that includes at least one control script. The at least one control script is configured to be executed according to an execution environment (e.g., a graphics processing environment) of the second computing device. Once executed, the at least one control script may be configured to access a native application programming interface (API) of the second computing device to cause graphical data to be presented via an output interface (e.g., a display) communicatively coupled to the second computing device based on a context defined by the at least one control object.

19 Claims, 6 Drawing Sheets

(56) References Cited

U.S. PATENT DOCUMENTS

2012/0089977 A1     4/2012   Park et al.
2016/0072860 A1*   3/2016   Bill ........................ G06Q 10/10
                                                                                    709/204

OTHER PUBLICATIONS

Interfuser, "Android renderscript, more info' and an example application," Remote RenderScript\ArtIInterfuser Android renderscript, more info' and an example application—Accessed Jan. 4, 2011.htm, 7 pp.

* cited by examiner

REMOTE RENDERING CONTROL OBJECTS

CROSS REFERENCE TO RELATED APPLICATIONS

This application claims the benefit of priority of U.S. Provisional Application No. 61/469,346, filed Mar. 30, 2011, the entire content of which is hereby incorporated by reference.

TECHNICAL FIELD

This disclosure is directed to the display of images.

BACKGROUND

In recent years, mobile devices (e.g., smartphones, tablet computers, and the like) have become increasingly popular with consumers. Many of these devices incorporate a display through which images such as video, photos, or other graphical output of software applications are displayed to users. Such mobile devices allow for the portable display of graphical information. However, such devices often have a relatively small screen or are less convenient in comparison to other devices, such as a television, desktop computer monitor, or in-dash automobile displays.

SUMMARY

In general, this disclosure is directed to techniques for the inter-device control of graphical output. According to the techniques of this disclosure, a first computing device may be configured to control the processing of graphical output by a second computing device by generating and communicating at least one control object to the second computing device. The at least one control object includes at least one control script that is executable by an execution environment (e.g., a graphics processing environment) of the second computing device to generate graphical output using an output interface communicatively coupled to the second computing device. When executed, the at least one control script may be configured to access a native application programming interface (API) of the execution environment of the second computing device, and thereby reduce an amount of data generated and/or communicated by the first computing device to control the processing and/or display of graphics by the second computing device.

For example, a method is described herein. The method includes receiving, by a first computing device, one or more indications of graphical output from an application that is written in a device-independent programming language. The method further includes generating, by the first computing device and based on the one or more indications of graphical output, at least one control object comprising at least one control script configured to be executed by a second computing device to generate a graphical output through a hardware interface of the second computing device based on a context defined by the at least one control object. The method further includes sending, from the first computing device to the second computing device, the at least one control object for execution by the second computing device.

As another example, a device is described herein. The device includes a first computing device configured to receive one or more indications of graphical output from an application written in a device-independent programming language. The device includes means for generating, by the first computing device and based on the one or more indications of graphical output, at least one control object comprising at least one control script configured to be executed by a second computing device to generate a graphical output through a hardware interface of the second computing device based on a context defined by the at least one control object. The device further includes at least one communications module configured to send, from the first computing device to the second computing device, the at least one control object.

As another example, a computer-readable storage medium comprising instructions configured to cause a first computing device to perform operations that include receiving one or more indications of graphical output from an application written in a device-independent programming language, generating, based on the one or more indications of graphical output, at least one control object comprising at least one control script configured to be executed by a second computing device to generate a graphical output through a hardware interface of the second computing device based on a context defined by the at least one control object, and sending, to the second computing device, the at least one control object.

According to another example, a method is described herein. The method includes receiving, by a computing device and from an application written in a device-independent language executing on a different computing device, at least one control object comprising at least one control script executable by the computing device that defines a context for accessing a native application programming interface (API) of the computing device. The method further includes executing the at least one control script according to the native API of the computing device to generate a graphical output through a hardware interface of the computing device based on the context defined by the at least one control object.

The details of one or more examples of this disclosure are set forth in the accompanying drawings and the description below. Other features, objects, and advantages will be apparent from the description and drawings, and from the claims.

DETAILED DESCRIPTION

This disclosure is directed to techniques for the remote control of image display, on a destination device, by a software application executing on a host device. To control display of images on the destination device, the host device may generate and communicate at least one control object to the destination device. The host device and/or software executing on the host device may be configured to control the display of images by the destination device based on at least one control object. At least one compiled script of the control object may be executed according to an execution environment of the destination device, thereby reducing an amount of data processed and/or communicated for the remote display of images on the destination device in comparison to other techniques for remote image display control. In some examples, the compiled script may continue to execute on the destination device and receive updates from the host device regarding the display of images. In some examples, this technique may further reduce an amount of data needed to remotely control the display of images, by reducing a number of control objects generated by the host device and communicated to the destination device.

Figure 1:
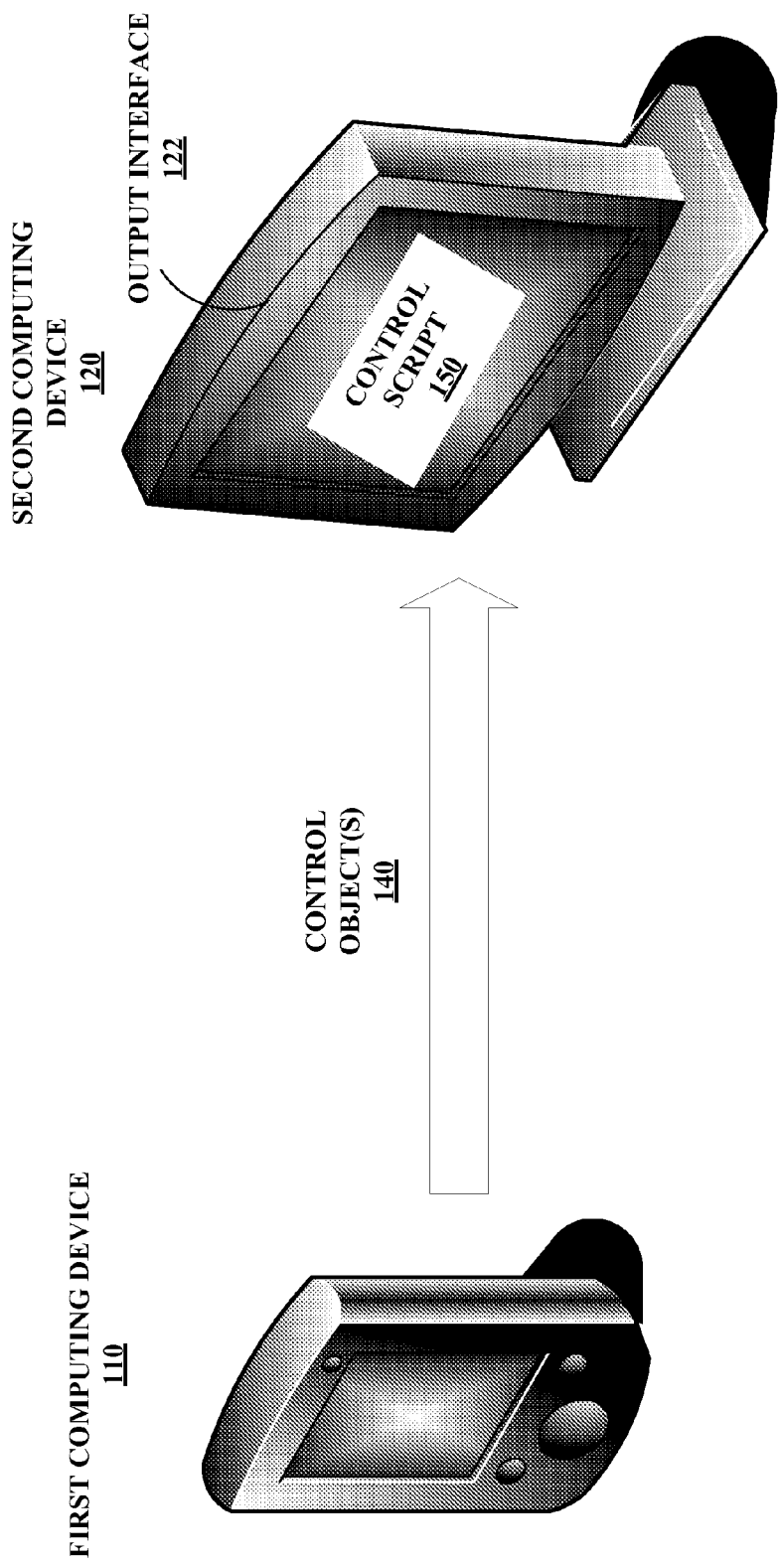
FIG. 1 is a conceptual diagram that illustrates one example of inter-device control of graphical output consistent with the techniques of this disclosure.

FIG. 1 is a conceptual diagram that illustrates one example of a first (host) computing device 110 configured to cause graphical output of a first software application written in a device-independent programming language operating on the first computing device to be displayed on an output interface 122 (e.g., a display) coupled to a second (destination) computing device 120. The graphical output of the first software application may include commands or data configured to cause one or more images to be presented via at least one output interface 122 (e.g., a display screen). In some examples, the graphical output of the first software application may include image data representing pixels of images that may be used by a display to present or modify images. In other examples, graphical output of a first software application may include higher-level graphics commands (e.g., one or more commands according to the OPENGL standard specification for generating 2D or 3D graphical output) configured to cause image data to be displayed or modified. In still other examples, the graphical output of the first software application may include operating system level or other types of commands configured to cause graphical output to be presented or modified via an output interface (e.g., a display of second computing device 120).

According to the techniques of this disclosure, to control graphical output of second computing device 120, first computing device 110 may generate at least one control object 140 and communicate the control object 140 to the second computing device 120. Control object 140 includes at least one control script 150. The at least one control script 150 may be executable according to an execution environment (e.g., a graphics processing environment) of second computing device 120. Second computing device 120 may execute the at least one control script 150 to cause graphical output to be displayed via output interface 122 (e.g., a display) communicatively coupled to second computing device 120.

In some examples, once executed on the second computing device 120, the second software application may be configured to receive, from the first software application executing on first computing device 110 (or another software application operating on first computing device 110) at least one indication of an update to graphical output provided by second computing device 120. The second software application may, based on the at least one indication, modify displayed graphical output provided via the output interface.

In various examples as described in further detail below, the techniques of this disclosure may allow for inter-device control of graphical output, while minimizing an amount of data communicated and/or processed by a host and/or destination device to control graphical output between the respective devices, in comparison to other techniques. For example, the techniques of this disclosure may provide for data compression and efficient data updates to control a remote display, without degrading a visual experience. These techniques may further be advantageous, as they may be utilized to control a variety of different second computing devices 120 configured to operate according to different programming languages, operating systems, and/or components of such second computing devices 120.

According to the example of FIG. 1, first computing device 110 is a mobile phone, and second computing device 120 includes a display. According to the examples where second computing device 120 includes a display as depicted in FIG. 1, the second computing device 120 may include instruction processing circuitry (e.g., a "smart" display). For example, such a display may include one or more graphics processing unit(s) (GPU) and/or other hardware or software configured to control the display of graphical output via the screen of the display. In other examples, such a display may also or instead include a central processing unit (CPU) and or other circuitry/devices configured to execute more generic software instructions. More generic circuitry of second computing device 120 such as a CPU may be configured to control the display of graphical output.

According to other examples, second computing device 120 may include more than a single device. For example, second computing device 120 may include a display screen that is communicatively coupled to another computing device configured to process graphics and control the display of images on one or more screens. For example, second computing device 120 may include one or more display screens and any combination of digital media players (e.g., BLURAY, DIGITAL VIDEO DISC (DVD), COMPACT DISC (CD), and the like), gaming consoles (e.g., PLAYSTATION 3, XBOX 360), personal computers (e.g., desktop computer), mobile devices (e.g., cellular phone, smartphone, tablet computer, laptop computer) that may or may not include their own display. Any configuration of devices configured in combination to include one or more display screens and/or processing circuitry configured to execute instructions to cause graphical output to be displayed may be contemplated as second computing device 120 consistent with the techniques described herein.

As depicted in FIG. 1, first computing device 110 may be a mobile device, such as a cellular phone, smartphone, tablet computer, laptop computer, wearable computing device (e.g., a watch) or the like. In other examples, first computing device 110 may be any device configured to execute program instructions, for example, a desktop computer, gaming console, media player, set-top box, or the like. The first computing device 110 may or may not include a display screen, and may or may not be communicatively coupled to a display screen for the display of images.

As depicted in FIG. 1, in some examples second computing device 110 may be a device with a larger and/or otherwise more desirable or convenient screen than first computing device 110 (if first computing device 110 is communicatively coupled to a display screen). For example, second computing device 110 may be a television display, desktop computer monitor, or automobile display. In some instances, the second computing device 120 may include a power source, which may be a factor in the desirability of using a display of the second computing device 120 instead of a display of the first computing device 110.

Figure 2:
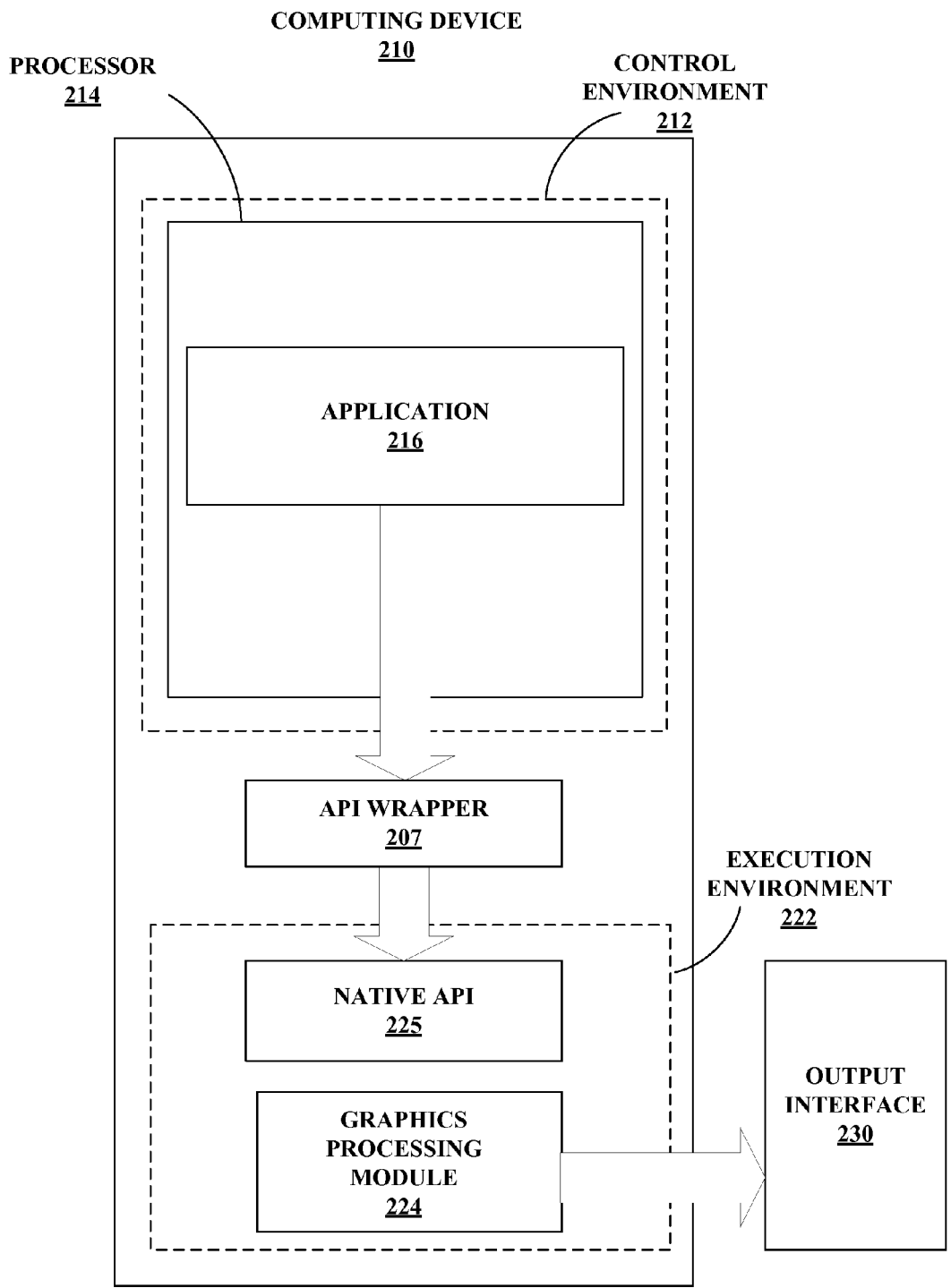
FIG. 2 is a block diagram that illustrates one example of a computing device configured to display graphical output.

FIG. 2 is a block diagram that illustrates one example of a computing device 210 configured to generate graphical output via an output interface 230 communicatively coupled to the computing device 210. As one non-limiting example, computing device 210 may correspond to a mobile device such as a mobile phone as depicted in FIG. 1. In other examples, computing device 210 may include any computing device capable of processing instructions to generate graphical output for display. As shown in FIG. 2, computing device 210 includes distinct operating environments, a control environment 212 and an execution environment 222. Generally speaking, control environment 212 may be configured to execute a software application 216, and execution environment 222 may be configured to generate graphical output to be displayed via output interface 230 (e.g., a display screen). Control environment 212 may be different from execution environment 222. For example, control environment 212 may operate using a different operating system, different hardware, and/or using a different programming language than execution environment 222. According to one example, control environment 212 may execute on a central processing unit (CPU) of computing device 210. According to one example, control environment 212 may be configured to execute program instructions on a processing component such as a CPU of computing device 210 (or another component of computing device 210) written in a device-independent programming language. The device-independent programming language may be configured such that instructions written in the programming language are executable according to a variety of operating environments, such as different operating systems and/or hardware configurations of computing devices 210. For example, a device-independent programming language may be configured to be executed according to a Microsoft Windows®, Apple OSX®, Apple iOS®, or Google Android® operating system. One non-limiting example of such a device-independent programming language is the Java® programming language provided by Sun Microsystems®.

According to the example depicted in FIG. 2, in order for output of application 216 to be displayed to a user via output interface 230, application 216 may access execution environment 222 of computing device 210. Execution environment 222 of computing device 210 may be configured to process instructions and/or data graphical output of computing device 210. For example, the execution environment 222 may be configured to execute instructions written in a different programming language than control environment 212. In some examples, execution environment 222 may further be configured to execute using different hardware components of computing device 210 than control environment 212. For example, execution environment 222 may be configured to execute on one or more graphics processing modules 214 (e.g., a graphics processing unit (GPU)) of computing device 210, while control environment 212 may be configured to execute using a CPU of computing device 210. According to one non-limiting example, execution environment 222 may be configured to operate according the international standards organization (ISO) programming language C99. According to other examples, execution environment 222 may be configured to operate according to one or more of the open source Haskell programming language, the Fortran programming language, the C++ programming language, the Forth programming language, or any other programming language.

According to the example depicted in FIG. 2, application 216 may access graphics processing functionality of execution environment 222 by communicating one or more commands indicating graphical output to execution environment 222 for processing. Because control environment 212 differs from execution environment 222 as described above, execution environment 222 may not be configured to directly interpret commands communicated from control environment 212. As such, according to the example of FIG. 2, application 216 may be configured to access an API wrapper 207. API wrapper 207 may define an interface for the translation of commands from control environment 212 to commands interpretable by a native API 225 of execution environment 222. Native API 225 of execution environment 222 may define one or more commands that execution environment 222 is configured to interpret and utilize to generate graphical or other output.

In some examples, a computing device 210 as illustrated in FIG. 2 may be configured to communicate one or more indications of graphical output to another computing device (not depicted in FIG. 2). To do so, according to one example, computing device 210 may communicate one or more indications of graphical output processed by execution environment 222 to the second computing device, as original graphics data or in a compressed format. In some examples, this technique may be undesirable, as a large amount of data may be needed to display processed graphical output by the second computing device. Such techniques may be specifically undesirable where a low power and/or low bandwidth communications technique is used to transmit processed graphical data to the second computing device.

According to another example, computing device 210 may be configured to control graphical output of a second computing device based on communication of one or more higher-level (e.g., control environment-level) commands to the second computing device. According to this example, the second computing device may need to be configured to interpret the higher-level commands, and access an API wrapper (e.g., similar to API wrapper 207 illustrated with respect to computing device 210 in FIG. 2) of an execution environment of the second computing device in order to communicate through a native API of the second computing device (e.g., similar to native API 225 illustrated in FIG. 2 with respect to computing device 210), such that the execution environment of the second computing device may process received higher-level commands. Such a command may be directed to higher-level elements of graphical output, such as "draw a triangle at this location." One non-limiting example of such a higher-level command is one or more commands available according to the OPENGL standard for 2D and 3D graphics. In some examples, such techniques may be undesirable, because communicating graphics commands for processing using an API wrapper may require a large amount of processing power to translate higher-level commands to commands interpretable by the execution environment of the second computing device. The techniques described with respect to FIG. 3 below are one example of an alternate technique that may not suffer from the undesirable aspects described above.

Figure 3:
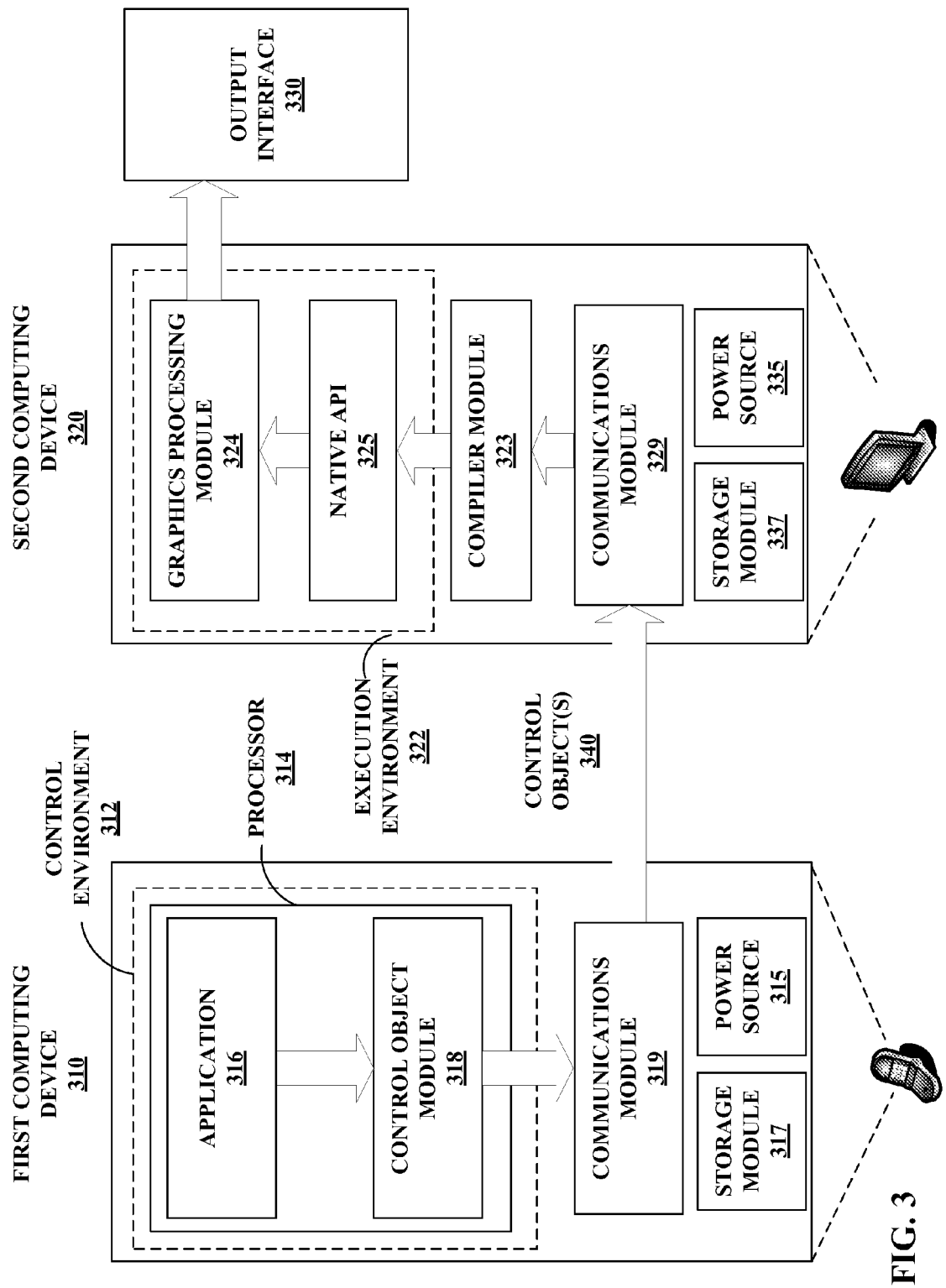
FIG. 3 is a block diagram that illustrates one example of inter-device control of graphical output consistent with the techniques of this disclosure.

FIG. 3 is a block diagram that illustrates one example of a first computing device 310 configured to control graphical output of a second computing device 320 by communicating at least one control object 340 to the second computing device 320. As shown in FIG. 3, first computing device 310 includes a control environment 312 similar to control environment 212 of computing device 210 depicted in FIG. 2. In some examples, similar to computing device 210, first computing device 310 may further include an execution environment configured to process graphical output for display using an output interface 230 as depicted in FIG. 2 (an output interface is not shown in FIG. 3. According to the example of FIG. 3, first computing device may or may not be communicatively coupled to, or include, an output interface 230 as depicted in FIG. 2.

As shown in FIG. 3, an application 316 is configured to execute according to control environment 312 of first computing device 312. Application 316 may be written in a device-independent programming language, as also described in one or more of the examples above.

According to the example depicted in FIG. 3, control environment 312 of first computing device 310 includes control object module 318. As described in further detail below, control object module 318 may be configured to generate at least one control object. The at least one control object may include at least one control script. The at least one control script may be configured to be compiled by first computing device 310 to be executable according to execution environment 324 of second computing device 320 to generate a second software application (not depicted in FIG. 3) that is configured to cause the second computing device to display and/or modify display of one or more images.

The at least one control object 340 may be communicated to the second computing device 320 via a communications module 319 of the first computing device 310. The communications module 319 of the first computing device 310 may be configured to communicate according to any form of wired or wireless communications, for example ETHERNET, WI-FI, BLUETOOTH, or any other communications protocol. The at least one control object 340 may be received via a communications module 329 of second computing device 320, which may also configured to communicate according to any form of wired or wireless communication. The at least once control object 340 may include at least one script configured to be executed according to execution environment 322 of second computing device 320. Once executed, the at least one script may cause graphical output to be displayed via an output interface 330 communicatively coupled to (or part of) second computing device 320 based on content of the one or more control objects 340.

In some examples, control object module 318 may be configured to generate one or more control objects 340 based on one or more characteristics or conditions of second computing device 320. For example, control object module 318 may be configured to determine one or more characteristics or conditions regarding execution environment 322 of second computing device 322, and generate one or more control objects 340 based on the one or more characteristics. As one example, control object module 318 may receive from second computing device 320 one or more indications of an operating system, programming language, native API 325, or other characteristic of execution environment 322 of second computing device 320, and generate the control object 320 specifically for execution environment 322 based on the one or more received indications. For example, control object module 318 may generate at least one control script configured to execute in a determined operating system, programming language, native API 325, graphics processing module (GPM) 324, or other characteristic of execution environment 322.

According to another example, control object module 318 may also or instead determine one or more conditions of second computing device 320 such as a processing or communications capability and/or workload of of execution environment 322, and generate the control object 320 based on the determined capability and/or workload. For example, control object module 318 may generate a control object 340 that includes more data where an execution environment 322 has higher processing/communications capabilities and/or a smaller workload, than if another execution environment 322 (e.g., of another device) with lower processing/communications capabilities and/or a larger workload.

In some examples, at least one control script of a control object 340 may be configured continue to execute according to the execution environment 322 of the second computing device 320 to control the display of images via output interface 330. For example, the at least one control script may be configured to receive from first computing device 310 at least one indication of an update to graphical output. Executing the at least one control script may modify presentation of graphical output via output interface 330 based on the at least one received indication of an updated to graphical output.

The techniques described above with respect to FIG. 3 may, in some non-limiting cases, be advantageous for a number of reasons. For example, by communicating one or more indications of graphical output in the form of at least one control object, computing device 310 may be configured to control graphical output of second computing device 320 without communicating already processed graphical data, which may require transmission of a large amount of data, and which may be undesirable where a limited amount of bandwidth is available. According to another example, the techniques described above with respect to FIG. 3 may be advantageous, because by communicating at least one control object 340 for inter-device control of displayed images, application 316 may directly access an execution environment 322 of second computing device 320, and thereby avoid accessing execution environment 322 via an API wrapper as described above with respect to FIG. 2. As such, an amount of processing power (e.g., CPU/GPU processing cycles) used and/or data communicated by the first and second computing devices to control graphical output of the second computing device 320 may be minimized. Although the techniques of this disclosure are described in terms of remote control of graphical output of a second computing device by a first computing device, in other example, the techniques described herein may be similarly applicable to audio output of a second computing device, or any other type of user detectable output of a computing device.

As also shown in FIG. 3, first and second computing devices 310, 320 may each include one or more storage modules 317, 337. Storage modules 317, 337 may include one or more components of computing device 201 configured to store data and/or program instructions. For example, storage modules 317, 337 may include one or more temporary (e.g., random access memory (RAM)) and/or long-term (e.g., magnetic hard disk, FLASH memory, optical disc) storage components. In some examples, storage modules 317, 337 may store one or more computer-readable instructions that, when executed by a processor (processor 314 of first computing device 310, graphics processing module 324 of second computing device 320), cause the respective computing device 310, 320 to operate in a manner consistent with the techniques of this disclosure.

As also shown in FIG. 3, devices 310, 320 may also include one or more power sources 315, 335. The one or more power source 315, 335 may comprise one or more components configured to store energy (e.g., one or more batteries configured to electrical power energy) to power one or more components of devices 310, 320. For example, energy stored by the one or more power source 315, 335 may be used to power one or more of processor 315, graphics processing module 324, communications modules 319, 329, storage modules 317, 337, and/or output interface 330. In some examples, the techniques of this disclosure may enable first computing device 310 to control graphical output of second computing device 320, while minimizing an amount of power (e.g., power stored in power source 315) consumed by first computing device 310 to control second computing device 320. For example, by generating and communicating one or more control objects as described herein, first computing device 310 may control second computing device 320 without communicating image data that describes pixels and/or higher-level graphics commands as described above, each of which may consume undesirable amounts of power.

Figure 4:
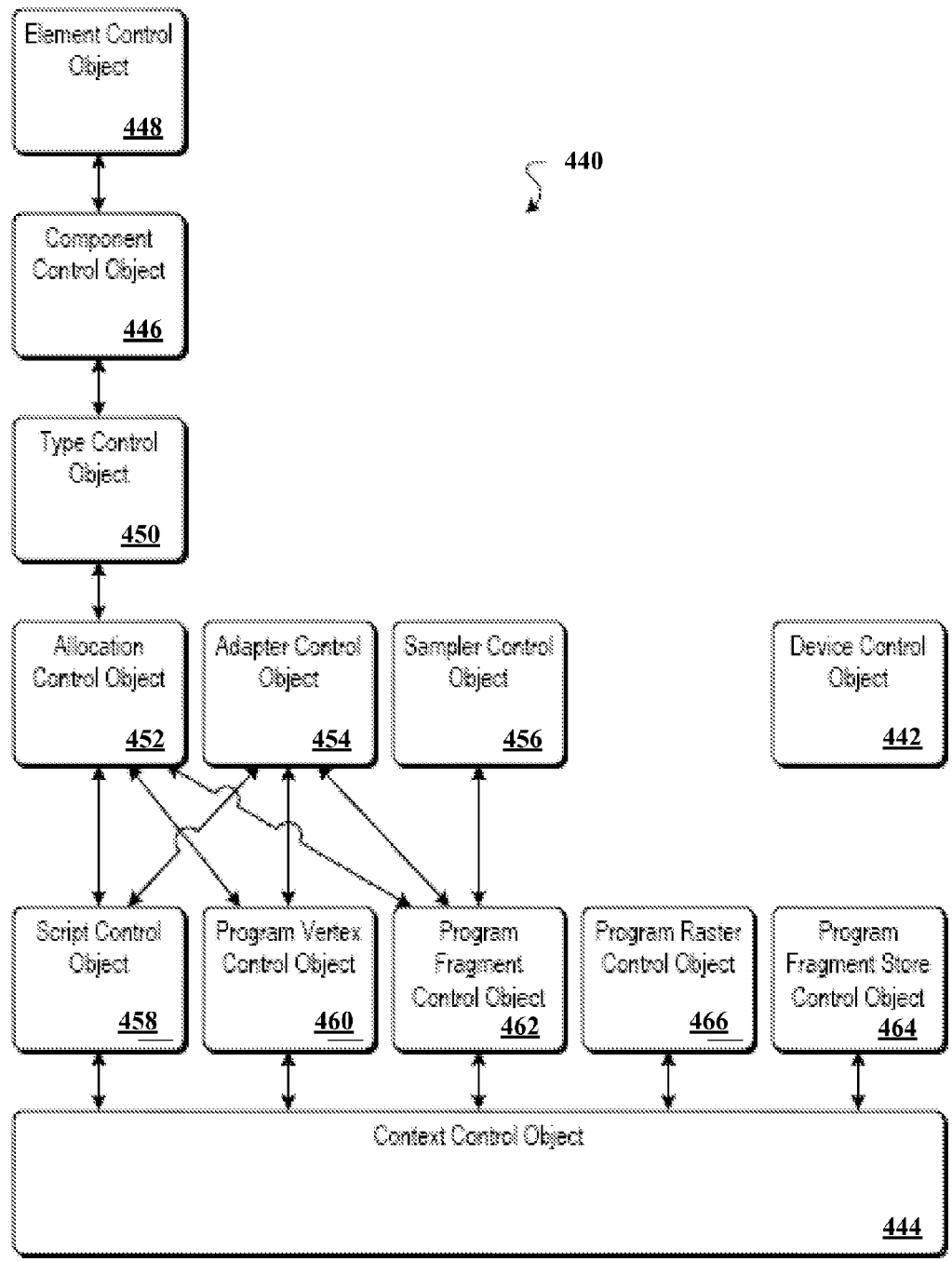
FIG. 4 is a conceptual diagram that illustrates one example of a method of inter-device control of graphical output consistent with the techniques of this disclosure.

FIG. 4 is a block diagram that illustrates one example of various control objects 440 that may be generated by control object module 318. Generally speaking, the control objects 440 illustrated in FIG. 4 are non-limiting examples of programmable instructions (e.g., scripts) and/or data communicated by first computing device 310 to control the display of images via second computing device 320 consistent with the techniques of this disclosure. Other examples not specifically described herein are also contemplated and consistent with the techniques of this disclosure.

In one example, one or more control objects 440, when passed to an execution environment (e.g., execution environment 322 illustrated in FIG. 3), may provide access to a native rendering API 325 of second computing device 320. In various examples, a parent application (e.g., application 316 illustrated in FIG. 3) that is written in a device-independent (e.g., high-level) programming language may create or instantiate the one or more control objects 440 using control object module 318. In some examples, control object module 318 may be written in or otherwise accessible by a high-level programming language of the application 316. In some examples, one or more control scripts of the one or more control objects 440 may include instructions for accessing a native API 325 of the second computing device 320 based on state information or other data of the one or more control objects 440.

In one example, application 316 and/or control object module 318 may generate one or more function or procedure calls to generate one or more control objects 440. For example, application 316 may be configured to call a "Begin" procedure of control object module 318 that may reset an internal object creation buffer to a default state. In another example, application 316 and/or control object module 318 may utilize one or more temporary builder objects that contain an internal creation state. In some examples, a temporary builder object may allow application 316 and/or control object module 318 to construct multiple control objects 440 concurrently. According one example, application 318 may generate commands that may modify a default state of an internal object creation buffer or temporary builder object to a state desired by application 318. Once one or more control objects are in desired initialization state, application 316 and/or control object module 318 may execute a "Create" procedure that may construct one or more control objects from a desired state and provide the control object to application 316. In some examples, multiple control objects 440 may be created in this manner.

In some examples, control object module 318 may be configured to count a number of generated control objects 440 and/or a number of other control objects 440 associated with a particular control object 440. For example, control object module 318 may be configured to generate a handle for a created control object 440 with an initial reference count value of one. Each time control object module 318 associates the control object 440 with another control object 440, control object module 318 may increment the reference count associated with the control object.

According to one example, control object module 318 may decrement a reference count of a control object 440 when control object module 318 disassociates another control object 440 from the control object 440. In some examples, this may allow the control object module 318 to create a control object 440, and associate the control object 440 to another control object, 440 and/or any reference from application 316.

According to one example, control object module 318 may destroy a control object 440 once it disassociates the control object 440 from at least one other control object 440. This may occur, for example, during a destruction procedure for the at least one other control object 440. In some examples, application 316 may use control object module 318 to initiate such destruction procedure for a particular control object 440.

The example of the control objects 440 shown in FIG. 4 includes a number of control objects 440 that may divide up operations associated with accessing native API 325 of second computing device 320. One example of such a control object is device control object 442. Device control object 442 may include instructions and/or data configured to enable first computing device 310 to access execution environment 322 of second computing device 320. For example, device control object 442 may include instructions and/or data configured to access specific hardware and/or software that implements native API 325 of execution environment 322. In some examples, device control object 310 may include instructions and/or information such as a version of an operating system, programming language, version, type of graphics processing module of the second computing device, or other instructions or information that may enable one or more scripts of a control object as described herein to execute in execution environment 322 of second computing device 320.

In some examples, control objects 440 may include multiple device control objects 442. For example, where second computing device 320 is communicatively coupled to more than one output interface 330 (e.g., more than one display screen) a device control object 442 may be associated with for each of the output interfaces 330. In another example, where second computing device 320 includes more than one native API 325 (e.g., associated with more than one execution environment 322), control object module 340 may generate a device control object 442 for each of the native APIs 325.

In some examples, control object module 318 may communicate with second computing device 320 to determine one or more characteristics or conditions of an execution environment 322 of second computing device 320. For example, control object module 318 may be configured to communicate with second computing device 320 to determine an operating system, programming language, native API 325, version of an operating system, native API 325, and/or programming language, and/or hardware characteristics (e.g., type of graphics processing hardware such as a GPU, processing capabilities of hardware components) of execution environment 322. In some examples, once device control object 442 is generated, object control module 318 may use device control object 442 to create one or more other control objects, such as other control objects 440 depicted in FIG. 4.

In some examples, control object module 318 is configured to generate a context control object 444. Context control object 444 may include instructions and/or data that indicate a state of an execution environment 322 of second computing device 320. For example, context control object 444 may include an indication of an active graphical rendering pipeline of a plurality of graphical rendering pipelines of execution environment 322. According to one example, context control object 444 may be configured to communicate with various programs or other control objects that form a currently active rendering pipeline. According to another example, context control object 444 may also or instead include an indication of a version of a native API 325 of execution environment 322. In some examples, a calling application, such as the application 316, may be configured to utilize more than one context control object 444 to control second computing device 320.

In some examples, control object module 318 may be configured to generate control objects 440 that correspond to multiple different native API 325. For example, control object module 318 may generate a context control object 444 specific to a native API 325 configured to enable access to an execution environment 322 written in a particular programming language, that utilizes a particular operating system, uses a particular revision of a programming language or operating system, and/or that uses particular hardware. In some examples, control object module 318 may be configured to generate a context control object 444 based on a particular revision or other characteristic of a calling application such as application 316.

In some examples, once a context control object 444 is generated by control object module 318, control object module 318 may associate the generated context control object 444 to a particular native API 325 and/or execution environment 322 as specified by one or more device control objects 442. In some examples, control object module 318 may be configured to remove dependency of one or more control objects 440 from a particular context control object 444, and re-associate the particular control object 440 to a different device control object 442. In some examples, control object module 318 may be configured to destroy one or more context control objects 444. As discussed above, in some examples, a device 442 or context 444 control object may be used to create other sub-control objects 440 that may describe the drawings or images to be rendered, such as a component control object 446 described in further detail below. According to these examples, destroying one or more device control objects 442 and/or context control objects 444 may also result in destruction of one or more other control objects 440 generated based on a destroyed device or context control object.

In some examples, control object module 318 may be configured to generate a component control object 446. Component control object 446 may include instructions or data regarding lower-level elements of graphical data. For example, one or more component control objects 446 may be associated with a pixel of a displayed image. According to one specific non-limiting example where images are represented according to a red-green-blue (RGB) color model, three component control objects 446 may represent information related to each of the respective red, green, and blue colors. According to one example, a component control object 446 may include an indication of a color the component control object 446 represents (e.g., red, green, or blue), which may be referred to as an alpha value. According to another example, a component control object 446 may instead or in addition include positional information (e.g., x, y, and/or z coordinates), normal information (e.g., normalized x, y, and/or z components), and/or texture coordinates (which may be referred to as s and t components). In some examples, a component control object 446 may describe properties of images to be rendered via an output interface 340. According to some examples, information of a component control 446 object may be used to create meshes of triangles, lines, or points of displayed images.

According to one example, a component control object 446 may include an indication of a number of bits that may be used to store the component control object 446. According another example, component control object 446 may also or instead include a storage format for the component control object 446, such as an indication of whether the storage format is a decimal floating point number, normalized, signed integer, or unsigned integer storage format.

Various examples of information that may be indicated by a component control object 446 are described above. Any data regarding the display of image data not described above may also or instead be included in a component control object 446 consistent with the techniques of this disclosure.

In some examples, control object module 318 may be configured to generate one or more element control objects 448. Element control object 448 may be configured to group one or more component control objects 446. For example, element control object 448 may include one or more script-defined data structures that indicate a grouping of one or more component control objects 446. In some examples, element control object 448 may itself include graphical data.

According to one example, an element control object 448 may represent contents of a particular location of a data structure that represents graphical data. For example, an element control object 448 may include a grouping of component control objects 446 that together represent one or more units of graphical data, such as a pixel, vertex (three-dimensional pixel), Texel (texture pixel), or other unit of graphical data. According to some examples, an element control object 448 may indicate a group of one or more component control objects 446 for a single unit of graphical data. In other examples, an element control object 448 may indicate a grouping of one or more control objects 446 for multiple units of graphical data in combination.

According to one non-limiting example as described above, an RGB pixel may include three component control objects 446 that in combination represent the RGB pixel. According to this example, an element control object 448 may indicate a grouping (e.g., R8, G8, B8) of the three component control objects 446 that each respectively indicate one of the three colors of the RGB pixel. In some examples, such an element control object 448 may further include one or more indications of position for the RGB pixel. For example, an element control object 448 may include an indication of position of the RGB pixel according to normal coordinates (e.g., nx, ny, and nz coordinates) or other coordinates (e.g., x, y, and z coordinates).

In some examples, control object module 318 may be configured to provide operations for the management of element control objects 448, for example operations that may be utilized by a software application 316 executing on first computing device 310. For example, control object module 318 may be configured to execute an internal state machine directed to the building of control objects 440, and may further be configured to receive from software application 316 a command to clear the internal state machine. According to another example, control object module 318 may include one or more internal buffers that generated element control objects 448 may be stored in. According to this example, control object module 318 may be configured to add one or more element control objects 448 to the internal buffer. In some examples, control object module 318 may add an element control object 448 to the internal buffer based on a predefined type, such as a type of date unit represented by the element control object (e.g., pixel, voxel, Texel, or other graphical data unit). According to another example, control object module 318 may be configured to, upon receipt of a request for one or more control objects 440 (e.g., from software application 316), return a reference to the one or more element control objects 448. According to another example, control object module 318 may be configured to destroy and/or release a reference to one or more element control objects 448.

In some examples, control object module 318 may be configured to generate one or more type control objects 450. Type control object 450 may indicate a grouping of one or more element control objects 448. In one example, a type control object 450 may indicate grouping of element control objects 448 associated with a particular dimensional structure of graphical data. In some examples, control object module 318 may be configured to determine a shape of such a dimensional structure based on one or more signals received from a calling application, such as application 316. For example, a type control object 450 may be configured to indicate one or more element control objects 448 and/or component control objects 446 associated with a particular positional region of graphical output (e.g., a square, triangle, circle, or other positional region). According to one example, type control object 450 may include one or more indications of a height, width, or other indication of a geometric positional shape indicated by a type control object 450.

In some examples, a type control object 450 may be configured to indicate one or more of several pre-defined dimensions or parameters to which application 316 assign values. In some examples, a type control object 450 may utilize a subset of available pre-defined dimensions or parameters. For example, a type control object 450 may indicate an X dimension. The X dimension may be considered a lowest order structural dimension. The type control object 450 may also indicate a Y dimension. If the type control object 450 indicates a Y dimension, then graphical data of a positional region indicated by the type control object 450 may represent graphical output viewable in two dimensions. In other examples, a type control object 450 may indicate a Z dimension. According to these examples, graphical data of a positional region indicated by the type control object 450 may represent graphical output viewable in three dimensions. According to some examples, a type control object 450 may indicate data other than graphical data.

In some examples, a type control object 450 may include an indication of a faces dimension. According to this example, the faces dimension may indicate that the type control object 450 represents a cubemap (e.g., three dimensional representation), even if the type control object 450 does not include an indication of a Z-dimension.

In some examples, a type control object 450 may include a true/false mips indication. The mips indication may indicate whether the type control object 450 includes one or more mipmaps (pre-calculated, optimized collections of images that accompany a main texture, intended to increase rendering speed and reduce aliasing artifacts) for one or more of X, Y, and Z portions of an image. According to another example, a type control object 450 may also include an indication of an array dimension. An array dimension may indicate a replication of an object represented by an X, Y, Z mipmap and at least one faces dimension. Dimensions of the array dimension (e.g., 64 by 64) may be user definable. According to this example, the array dimension may allow application 316 and/or one or more control scripts (e.g., of one or more control objects 440) to select between different substructures of graphical data. In some examples, control object module 318 may be configured to generate one or more allocation control objects 452. An allocation control object 452 may include an indication of where a particular type control object 450 and/or one or more sub-control objects (e.g., element control object 448, component control object 446) of the type control object 450 should be stored (e.g., on second computing device 320). For example, an allocation control object 452 may include an indication that particular graphical data should be assigned to one or more of a textures, vertex, or index data buffer. According to another example, an allocation control module 452 may include one or more (e.g., OpenGL vertex buffer object (VBO) hints).

In some examples, control object module 318 may be configured to create an allocation control object 452 based on one more element control objects 448. For example, control object module 318 may create an allocation control object based on a type control object 450. Control object module 318 may also or instead generate an allocation control object 452 based on one or more element control objects 448. According to this example, control object module 318 may generate a one-dimensional array of one or more element control objects 448.

According to one example, control object module 318 may be configured to receive data representing graphical output (e.g., an image file), construct a type control object 450 from the received image file, and create an allocation control object 452 based on the constructed type control object 450. According to one example, control object module 318 may further be configured to assign one or more allocation control objects 452 to one or more memory locations (e.g., texture memory) of execution environment 322. According to another example, control object module 318 may be configured to destroy and/or release a reference to a generated allocation control object 452.

In some examples, control object module 318 may be configured to generate an adapter control object 454. An adapter control object 454 may be configured to simplify one or more allocation control objects 452. For example, an adapter control object 454 may represent one or more allocation control objects 452 in a simpler structure than an allocation control object 452. According to one example, an adapter control object 454 may include a reference to one or more allocation control objects 452. In one example, an adapter control object 454 may indicate of one or more dimensions (e.g., X, Y, or Z dimensions) of an allocation control object 452 as a constant value. According to this example, the adapter control object 454 may present one or more other dimensions as one or more parameters. According to this example, an adapter control object 454 may include an indication of a type, such as whether the adapter control object 454 represents single, two, or three-dimensional graphical output. In another example, an adapter control object 454 may include one or more indications of constant dimensions y which an image filter of execution environment 322 may receive as inputs, such as a filter level of a mipmap, cubemap, or slices of a voxel.

According to one example, adapter control object 454 may be considered a conversion container that adapts an allocation control object 452 such that the allocation control object 452 is presented as a lower dimension object. For example, an adapter control object 454 may be configured to present an allocation control object 452 that indicates one or more mipmaps as a two-dimensional object.

In some examples, an adapter control object 454 may be used interchangeably with an allocation control object 452. According to one example, an adapter control object 454 may receive data from an allocation control object 452 to which the adapter control object 454 is associated. Control object module 318 may or may not copy data from an allocation control object 452 to create an adapter control object 454.

In some examples, control object module 318 may be configured to create or destroy one or more adapter control objects 454. Control object module 454 may further be configured to set one or more non-basic dimensions represented by an adapter control object 454 to a constant. According to this example, a larger type control object 450 may be accessed by an execution environment 322 of second device 320.

In some examples, control object module 318 may be configured to generate one or more sampler control objects 456. The one or more sampler control objects 456 may indicate a texture sample of graphical output. For example, a sampler control object 456 may indicate a state that may be used to generate a sample from a texture source and/or a positional coordinate. In one example, a sampler control object 456 may indicate one or more allocation control objects 452 (whether or not simplified by an adapter control object 454 as described above) and/or a definition of how the allocation control object 452 may be accessed as a texture. For example, a sampler control object 456 may indicate one or more wrap modes, filter modes, and other texture properties that may not be part of an associated allocation control object 452. In some examples, control object module 318 may be configured to associate a sampler control object 456 to a particular allocation control object 452, and/or for setting parameters associated with the sampler control object 456.

In some examples, control object module 318 may be configured to generate one or more script control objects 458. The one or more script control objects 458 may include at least one script that may be executed according to execution environment 322 of second computing device 320 to generate graphical output. According to one example, when executed according to execution environment 322, one or more scripts of script control object 458 may be configured to utilize information of one or more of element control object 448, component control object 446, type control object 450, allocation control object 452, adapter control object 454, and/or sampler control object 456 to generate graphical output for display.

According to one example, script control object 458 includes a portion of embeddable code that is received in source form from an application (e.g., application 316) and then compiled for execution and/or interpretation by execution environment 322 of second computing device 320. In other examples, control object module 318 may be configured to compile one or more scripts of a script control object 458 according to execution environment 322 of second computing device 320, such that the one or more scripts may be executed according to execution environment 322. In some examples, script control object 458 may include one or more commands that may be executed when a compiled script of script control object is executed by execution environment 322. In some examples, script control object 458 may include commands that are compiled into a process separate from other compiled scripts. In other examples, script control object 458 may include commands that are compiled in the same process as one or more other compiled scripts, but assigned to a different thread of the process than other compiled scripts.

In some examples, one or more scripts of a script control object 458 may run in a well-defined environment, such as is defined by one or more of the following features. For example, a script control object 458 may have access to only a short list of functions, such as a subset of functions made available by object control module 318. According to one example, the subset may exclude functions of control object module 318 configured to generate control objects 440. According to other examples, such a well-defined environment may include any of a small fixed size memory stack for the compiled scripts, which may prevent data from being directly shared between compiled scripts of one or more script control objects 458, which may prevent memory allocation, and/or may prevent the execution of other compiled scripts. In some examples, such a well-defined environment may provide functions for changing information associated with one or more context control objects 444 and/or running a compiled script concurrently with one or more other compiled scripts.

In some examples, control object module 318 may be configured to provide application 316 with a function to identify a script control object 458 as a "root" script control object. According to this example, a root script control object 458 may be configured to be attached to a surface of graphical output. For example, a root script control object 458 may be associated with one or more context control objects 444, and may be configured to, when executed, redraw graphical output each time the root script control object 458 is executed and/or called. According to this example, application 316 may be configured to, using control object module 318, communicate with one or more scripts executed scripts of a script control objet 458 to discard graphical data represented by one or more context control objects 444 for a next invocation of the executed scripts.

In some examples, when executed, one or more scripts of a script control object 458 may be configured to access data stored local to second computing device 320 (e.g., stored in one or more storage modules 337 of second computing device 320 as depicted in FIG. 3). According to one example, a script of a script control object 458 may include an implied allocation of temporary variables and/or may include one or more buffers configured to stored data. According to one example, such buffers may be configured to store data according to one or more allocation control objects 452 associated with the script control object 458. In one example, an associate of an allocation control object 452 to a script control object 458 may be read-only. In other examples, such an association may be writeable. According to some examples, a script of a script control object 458 may be configured to produce a persistent run-to-run state.

In some example, control object module 318 may be configured to pass data to one or more scripts of a script control object 318, when the one or more scripts are executed according to execution environment 322. For example, control object module 318 may be configured to communicate a reference to one or more allocation control objects 452 to an executed script. In some examples, control object module 318 may be configured to determine a type of allocation control object 452 associated with one or more scripts of a script control object 458 when the script control object 458 is created. In other examples, application 316 may be configured to, via commands communicated to control object module 318, modify an type of allocation control object 452 associated with one or more scripts of a script control object 458.

In some examples, one or more executed scripts of a script control object 458 may be configured to receive data in the form of one or more communicated parameters. According to these examples, such parameters may allow different data to be passed to different scripts of the same or different script control object 458. For example, where one or more script control objects 458 include a plurality of scripts each configured to draw different graphical images, each of the scripts may be configured to receive an indication of a different identifier for the respective image, and a position associated with an image to be drawn.

In some examples, one or more scripts of a script control object 458 may inherit a "default" state that is the state of an associated context control object 444 when script is first executed or instanced. In some examples, such scripts, when executed, may be lost when execution is complete. This may be advantageous, as side effects produced by executed scripts may be reduced. Also, in some examples, many such scripts may be executed concurrently.

In some examples, control object module 318 may be configured to generate one or more control objects 440 that mirror specific drawing operations that may be performed by an execution environment 322 of second device 320 (e.g., of a native API 325). For example, control object module 318 may be configured to generate a program vertex control object 460 and/or a program fragment control object 462. In one example where a native API 325 of execution environment 322 operates according to an OpenGL rendering API, a program vertex control object 460 and/or a program fragment control object 462 may be configured to operate similar to a vertex object or fragment object, respectively, of the OpenGL rendering API. In some examples, control object module 318 may further be configured to generate a program fragment store control object 464. A program fragment store control object 464 may be configured to encapsulate a state and/or programmable operation that may occur when a program fragment control object 462 is written to a buffer. In some examples, control object module 318 may be configured to generate a program raster control object 466. A program raster control object 466 may indicate a state that may be used to rasterize primitives from a vertex control object, and may provide rasterized primitives to a fragment control object 422. According to one example, such rasterized primitives may include points, lines, and/or triangles of graphical image data.

The various examples of control objects 200 that may be generated by a control object module 318 as described above may provide a set of objects for communicating information indicating images to be rendered on the an output interface 340 of second computing device 320. In some examples, control objects 440 as described above may further provide a representation of operations that may be performed based on access to a native rendering API 325 of execution environment 322 for manipulating and/or modifying displayed images. Further, control object module 318 may generate one or more script control objects 458 that include one or more compiled scripts executable according to an execution environment 322 of second computing device 320, and thereby provide direct access to graphical processing operations provided via a native rendering API 325 of the execution environment 322 to update the display screen with the rendered images.

Figure 5:
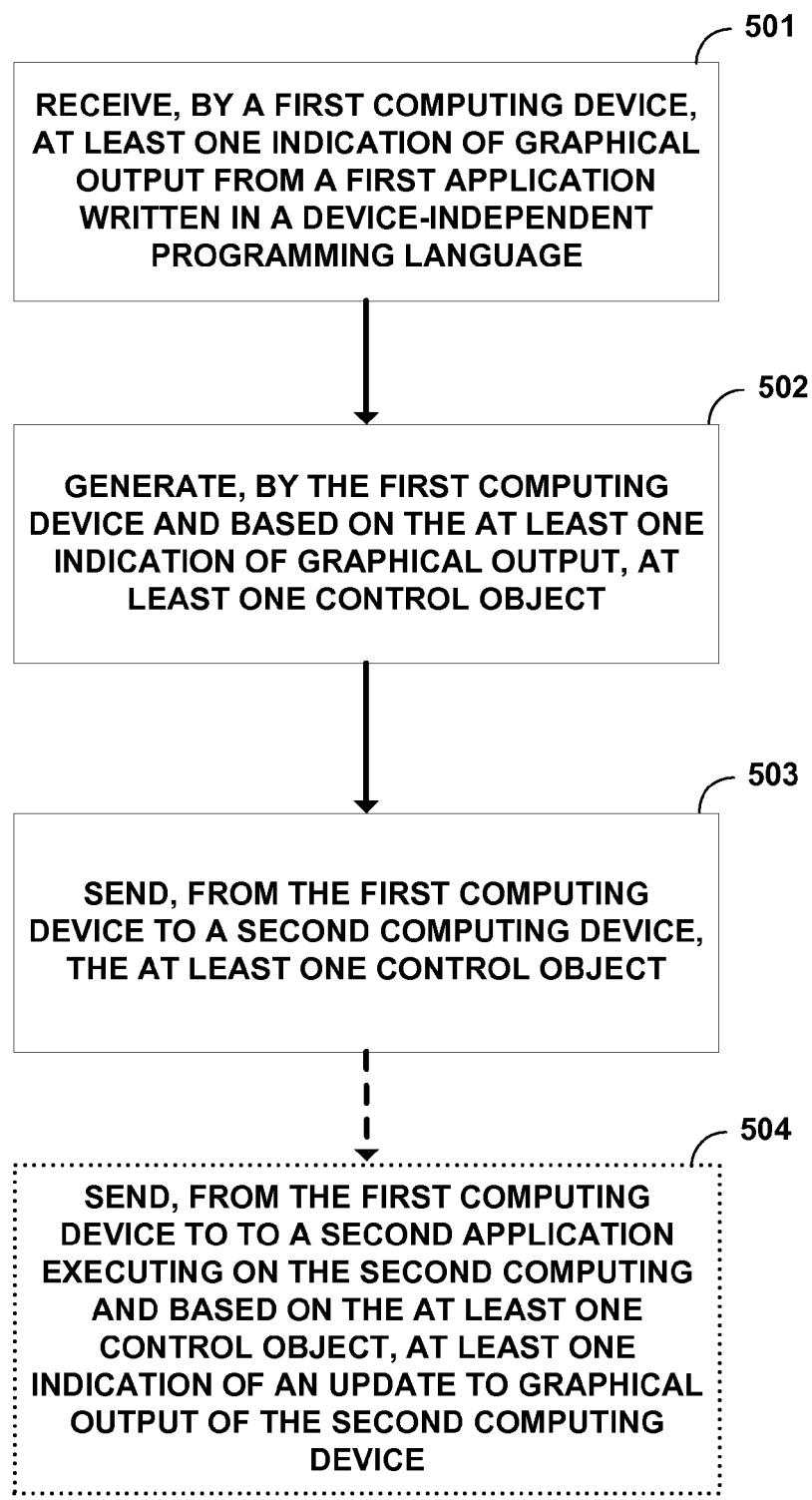
FIGS. 5 and 6 are flow diagrams that illustrate examples of inter-device control of graphical output consistent with the techniques of this disclosure.

FIG. 5 is a flow diagram that illustrates one example of a method for the inter-device control of image display consistent with the techniques of this disclosure. For purposes of illustration only, the method of FIG. 5 will be described with reference to one or more of the components shown in FIGS. 3 and 4.

According to one non-limiting implementation of the method depicted in FIG. 5, a control object module 318 of a first computing device 310 may receive at least one indication of graphical output from an application 316 executing on the first computing device 320 (501). The application may be written in a device-independent programming language. The control object module 318 may generate, based on the at least one received indication of graphical output, at least one control object 340, 440 (502). The at least one control object 340, 440 may include at least one script (e.g., at least one script of script control object 458). The at least one script may be configured to be executed according to an execution environment 322 of a second computing device 320 to cause the execution environment 322 to process graphical data for output. As also shown in FIG. 5, the control object module 318 may send, to the second computing device 320, the generated at least one control object 340, 440 (503). The second computing device 320 may execute the at least one script to generate graphical output using an output interface 340 coupled to the second computing device 320 to output graphics consistent with the at least one indication of graphical output received by the first computing device 310 from the application 316.

As illustrated by the dashed line in FIG. 5, in some examples, the at least one script of the at least one control object 440 may optionally continue to execute on the second computing device 320. The first computing device 310 (e.g., from control object module 318 and/or application 316) may communicate at least one indication of an update to displayed graphical output to the second computing device (504). The at least one script executing on the second computing device 320 may update graphical output provided using an output interface communicatively coupled to the second computing device based on the at least one received indication.

Figure 6:
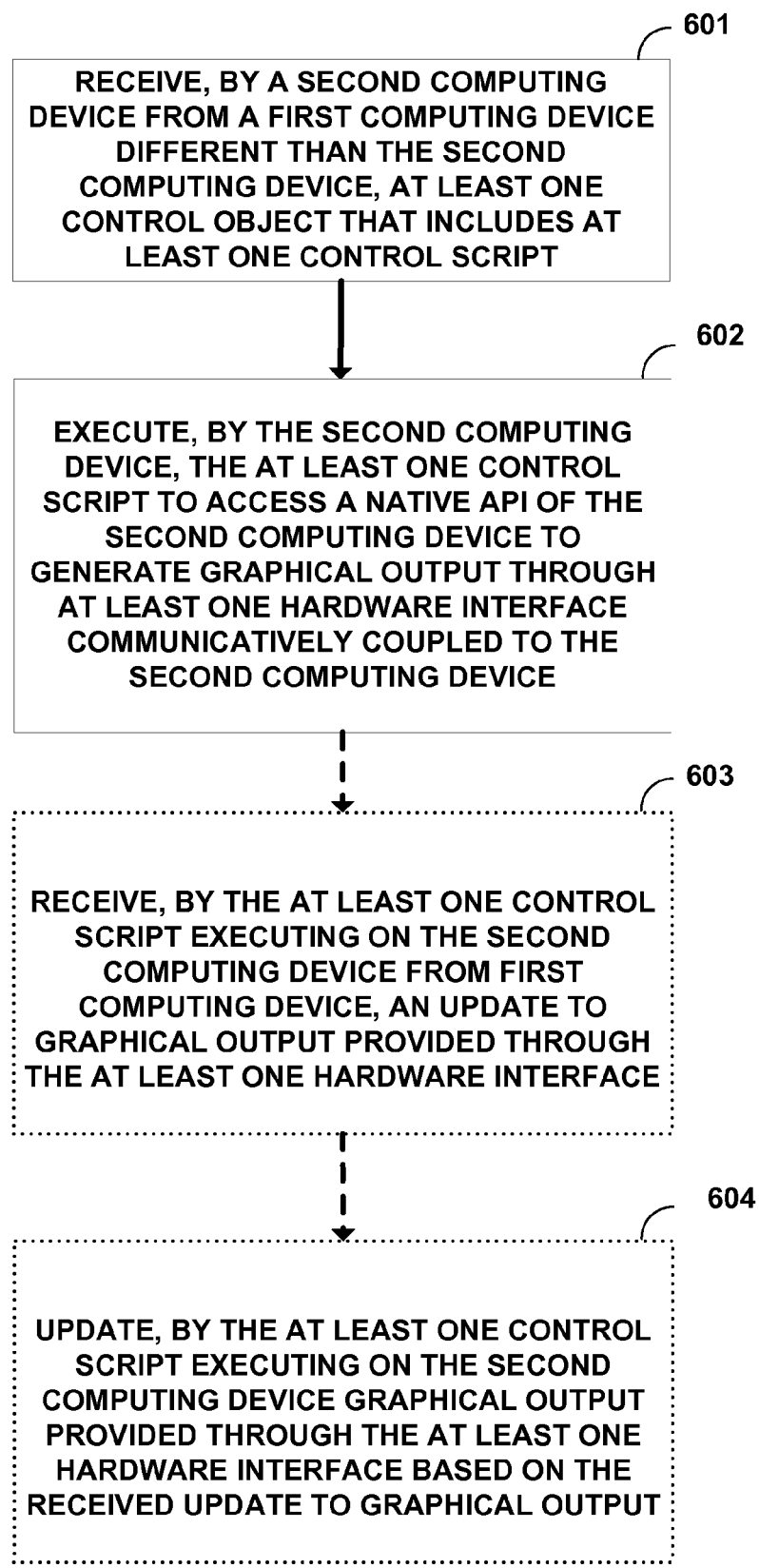

FIG. 6 is a flow diagram that illustrates one example of a method for the inter-device control of image display consistent with the techniques of this disclosure. For purposes of illustration only, the method of FIG. 6 will be described with reference to one or more of the components shown in FIGS. 3 and 4. As shown in FIG. 6, a second computing device 320 may receive, from a first computing device 310 different than the second computing device, at least one control object that includes at least one control script (601). In some examples, the at least one control object 440 may be generated by the first computing device 320 (e.g., by control object module 318 of first computing device 320) based on at least one indication of graphical output received by the first computing device 310 from an application 316 executing on the first computing device 310 according to a device-independent programming language. As also shown in FIG. 6, the second computing device 320 (e.g., execution environment 322) may execute the at least one control script to access a native API 325 of the second computing device to generate graphical output through at least one hardware interface 340 communicatively coupled to the second computing device 320 (602). As illustrated by the dashed line in FIG. 6, in some examples, the at least one control script may optionally continue to execute on the second computing device 320. The at least one control script may receive, from the first computing device, at least one update to graphical output provided through the output interface 340 communicatively coupled to the second computing device 320.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   providing, by a first computing device to a second computing device, an indicator of a native application programming interface (API) of the first computing device;
   receiving, by the first computing device from the second computing device, a control object that includes a control script, the control object executable in accordance with the native API of the first computing device;
   compiling, by the first computing device, the control script for execution in an execution environment of the first computing device;
   executing, by the first computing device, the control script;
   generating, by the first computing device, a first graphical output based on the executing control script;
   receiving, by the first computing device from the second computing device, an update to the first graphical output; and
   generating, by the first computing device, a second graphical output based on the update.

2. The method of claim 1, further comprising:
   prior to receiving the control object, providing, by the first computing device to the second computing device, an indicator of a characteristic of an executing environment of the first computing device.

3. The method of claim 1, further comprising:
   prior to receiving the control object, providing, by the first computing device to the second computing device, an indicator of a characteristic of an executing environment of the first computing device, the characteristic selected from the group consisting of an operating system, a programming language, and a hardware specification.

4. The method of claim 1, further comprising:
   prior to receiving the control object, providing, by the first computing device to the second computing device, an indicator of a characteristic of the execution environment of the first computing device, the characteristic selected from the group consisting of an operating system, a programming language, and a hardware specification, and
   wherein the control object is received in a configuration executable in accordance with the characteristic.

5. The method of claim 1, wherein the control object is indicative of graphical output of an application executing on the second computing device.

6. The method of claim 1, wherein the control object is indicative of graphical output of an application executing on the second computing device according to a device-independent programming language.

7. The method of claim 1, wherein the control script is received by the first computing device in source form.

8. The method of claim 1, wherein executing the control script comprises accessing the native API of the first computing device.

9. The method of claim 1, further comprising:
   displaying, by the first computing device, the second graphical output through a hardware interface communicatively coupled to the first computing device.

10. The method of claim 1, further comprising:
    displaying, by the first computing device, the first graphical output through a hardware interface communicatively coupled to the first computing device, and
    displaying, by the first computing device, the second graphical output through the hardware interface.

11. The method of claim 1, wherein generating the first graphical output comprises generating a portion of the first graphical output while executing a portion of the control script.

12. The method of claim 1, wherein receiving the update comprises receiving the update while executing the control script.

13. The method of claim 1, wherein generating the second graphical output is based on the executing control script and the update.

14. A non-transitory, computer-readable medium storing instructions, that when executed by a processor, cause the processor to perform operations comprising:
- providing, by a first computing device to a second computing device, an indicator of a native API of the first computing device;
- receiving, by the first computing device from the second computing device, a control object that includes a control script, the control object executable in accordance with the native API of the first computing device;
- compiling, by the first computing device, the control script for execution in an execution environment of the first computing device;
- executing, by the first computing device, the control script;
- generating, by the first computing device, graphical output based on the executed control script;
- receiving, by the first computing device from the second computing device, an update to the graphical output; and
- generating, by the first computing device, updated graphical output based on the received update.

15. The non-transitory, computer-readable medium of claim 14, wherein the operations further comprise:
- prior to receiving the control object, providing, by the first computing device to the second computing device, an indicator of a characteristic of the execution environment of the first computing device, and
- wherein the control object is received in a configuration executable in accordance with the characteristic.

16. The non-transitory, computer-readable medium of claim 14, wherein the update is indicative of a change to graphical output of an application executing on the second computing device.

17. The non-transitory, computer-readable medium of claim 14, wherein the first computing device is remote and distinct from the second computing device.

18. The non-transitory, computer-readable medium of claim 14, wherein the operations are performed while the first computing device is executing an operating system that is different from an operating system executing on the second computing device.

19. A first computing device comprising:
- a processor; and
- a non-transitory, computer-readable medium in communication with the processor and storing instructions that, when executed by the processor, cause the processor to perform operations comprising:
  - providing, by the first computing device to a second computing device, an indicator of a native API of the first computing device;
  - receiving, by the first computing device from the second computing device, a control object that includes a control script, the control object executable in accordance with the native API of the first computing device;
  - compiling, by the first computing device, the control script for execution in an execution environment of the first computing device;
  - executing, by the first computing device, the control script;
  - generating, by the first computing device, graphical output based on the executed control script;
  - receiving, by the first computing device from the second computing device, an update to the graphical output; and
  - generating, by the first computing device, updated graphical output based on the received update.

* * * * *